US012135118B2

(12) United States Patent
Li et al.

(10) Patent No.: US 12,135,118 B2
(45) Date of Patent: Nov. 5, 2024

(54) TENSIONING MECHANISM OF BOX AND LED BOX ASSEMBLY WITH TENSIONING MECHANISM OF BOX

(71) Applicant: SHENZHEN LEYARD OPTO-ELECTRONIC CO., LTD., Guangdong (CN)

(72) Inventors: Bingfeng Li, Guangdong (CN); Xiangang Gan, Guangdong (CN)

(73) Assignee: SHENZHEN LEYARD OPTO-ELECTRONIC CO., LTD., Guangdong (CN)

( * ) Notice: Subject to any disclaimer, the term of this patent is extended or adjusted under 35 U.S.C. 154(b) by 310 days.

(21) Appl. No.: 17/873,100

(22) Filed: Jul. 25, 2022

(65) Prior Publication Data

US 2023/0075996 A1 Mar. 9, 2023

(30) Foreign Application Priority Data

Sep. 7, 2021 (CN) ........................ 202111044721.9

(51) Int. Cl.

*F21V 19/00* (2006.01)
*F21S 2/00* (2016.01)

(Continued)

(52) U.S. Cl.

CPC ............ *F21V 19/003* (2013.01); *F21S 2/005* (2013.01); *F21Y 2115/10* (2016.08); *G09F 9/3026* (2013.01)

(58) Field of Classification Search

CPC .. G09F 9/3026; F21V 19/003; F21V 19/0035; F21V 19/004; F21V 17/20; F21S 2/005; F16B 21/02; F16B 21/09

See application file for complete search history.

(56) References Cited

U.S. PATENT DOCUMENTS

2008/0263924 A1 10/2008 Nearman et al.
2017/0211786 A1* 7/2017 Pan ........................ F16B 21/02

(Continued)

FOREIGN PATENT DOCUMENTS

CN 102711402 B 3/2015
CN 204221346 U * 3/2015 ........... G09F 9/3026

(Continued)

OTHER PUBLICATIONS

The extended European search report of the corresponding EP patent application No. 22189375.3, mail date Feb. 15, 2023.

(Continued)

*Primary Examiner* — Alexander K Garlen
(74) *Attorney, Agent, or Firm* — Samson G. Yu

(57) ABSTRACT

The present disclosure provides a tensioning mechanism of a box and a light emitting diode (LED) box assembly with the tensioning mechanism of the box. The tensioning mechanism of the box includes a tensioning structure including a base and a tensioning rod, where the base is provided with a mounting portion, the tensioning rod includes a tensioning pin and an operating portion connected with the tensioning pin, and the tensioning pin is movably arranged in the mounting portion in a penetrating manner; and a connecting member provided with a cooperating hole, where the tensioning pin includes a flat shaft, the flat shaft is capable of being inserted into or moved out of the cooperating hole, and under the condition that the flat shaft is inserted into the cooperating hole, the flat shaft has a vertical tensioning position and a transverse unlocking position. The technical solution of the disclosure effectively solves the problem that in the related technology, an external tool is required for drawing two adjacent boxes close, resulting in a complex tensioning process.

13 Claims, 12 Drawing Sheets

(51) Int. Cl.
*F21Y 115/10* (2016.01)
*G09F 9/302* (2006.01)

(56) References Cited

U.S. PATENT DOCUMENTS

| | | | | |
|---|---|---|---|---|
| 2017/0268554 | A1* | 9/2017 | Li | F16B 21/09 |
| 2021/0222859 | A1* | 7/2021 | Zhang | F16B 7/0413 |

FOREIGN PATENT DOCUMENTS

| | | | |
|---|---|---|---|
| CN | 105485105 | A | 4/2016 |
| CN | 205559457 | U | 9/2016 |
| CN | 108682320 | A | 10/2018 |
| CN | 110701159 | A | 1/2020 |
| CN | 210328213 | U | 4/2020 |
| CN | 212434146 | U | 1/2021 |
| CN | 216161360 | U | 4/2022 |
| WO | 2020134384 | A1 | 7/2020 |

OTHER PUBLICATIONS

The extended European search report of the corresponding EP patent application No. 22189375.3, mail date Feb. 25, 2023.

* cited by examiner

TENSIONING MECHANISM OF BOX AND LED BOX ASSEMBLY WITH TENSIONING MECHANISM OF BOX

CROSS-REFERENCE TO RELATED APPLICATION

This application claims the priority to Chinese patent application No. 202111044721.9, filed to the China National Intellectual Property Administration on Sep. 7, 2021, the disclosure of which is hereby incorporated by reference in its entirety.

TECHNICAL FIELD

The present disclosure relates to a technical field of light emitting diode (LED) display, and in particular to a tensioning mechanism of a box and an LED box assembly with the tensioning mechanism of the box.

BACKGROUND

A light emitting diode (LED) display screen includes a box assembly and a display screen mounted on the box assembly. The box assembly is assembled from a plurality of boxes. During field mounting, assembled boxes are deformed obviously, and there is a gap between two adjacent boxes, so display quality of the LED display screen is seriously affected. There is provided a tensioning mechanism in the related technology, by which the two adjacent boxes can be tensioned close to reduce the gap.

The tensioning mechanism includes a connection column connected with a box and a tensioning seat connected with another box. The connection column passes through the tensioning seat and is in threaded cooperation with a tensioning nut. The connecting column is sleeved with a spring. The spring is located between the tensioning seat and the tensioning nut. The tensioning nut is provided with a plurality of operation holes. An operation rod, an external tool, passes through an operation hole to screw the tensioning nut so as to apply a force to the spring, so that the tensioning nut is pressed on the connection column, and further the two adjacent boxes are tensioned close.

But the external tool is required for tensioning the two adjacent boxes close, resulting in a complex tensioning process. In addition, usage of the external tool leads to high cost of the LED display screen.

SUMMARY

A main objective of the present disclosure is to provide a tensioning mechanism of a box and a light emitting diode (LED) box assembly with the tensioning mechanism of the box, so as to solve the problem that in the related technology, an external tool is required for tensioning two adjacent boxes close, resulting in a complex tensioning process.

To achieve the objective, an aspect of the present disclosure provides a tensioning mechanism of a box. The tensioning mechanism of a box includes a tensioning structure including a base and a tensioning rod, wherein the base is provided with a mounting portion, the tensioning rod includes a tensioning pin and an operating portion connected with the tensioning pin, and the tensioning pin is movably arranged in the mounting portion in a penetrating manner; and a connecting member provided with a cooperating hole, wherein the tensioning pin includes a flat shaft, the flat shaft is able to being inserted into or moved out of the cooperating hole, and under the condition that the flat shaft is inserted into the cooperating hole, the flat shaft has a vertical tensioning position and a transverse unlocking position.

In some embodiments, the mounting portion is a mounting groove, the tensioning structure further includes a limiting member, and the limiting member is connected with the base and located at an opening of the mounting groove.

In some embodiments, the tensioning pin further includes a cooperating section arranged between the flat shaft and the operating portion, the tensioning structure further includes a positioning structure arranged between the cooperating section and the base, and the positioning structure enables the flat shaft to be kept at an insertion position for inserting into the cooperating hole or a move-out position for moving out of the cooperating hole.

In some embodiments, the positioning structure includes a positioning member, a first positioning hole and a second positioning hole, the first positioning hole is located between the second positioning hole and the flat shaft, the cooperating section is provided with the first positioning hole and the second positioning hole, the base is provided with the positioning member, when the positioning member cooperates the first positioning hole, the flat shaft is kept at the insertion position, and when the positioning member cooperates the second positioning hole, the flat shaft is kept at the move-out position.

In some embodiments, the positioning structure further includes a limiting hole provided on the base, the positioning member includes an elastic member and a positioning ball which are mounted in the limiting hole, the elastic member applies an elastic force to the positioning ball, a diameter of the first positioning hole and a diameter of the second positioning hole are both smaller than that of the positioning ball, and when the tensioning pin moves, a part of the positioning ball has a positioning position located in the first positioning hole or the second positioning hole and an avoiding position for avoiding the flat shaft.

In some embodiments, the base includes a base body as well as a first avoiding notch and a second avoiding notch which are arranged on the base body in a spaced manner, the first avoiding notch is located between the second avoiding notch and the flat shaft, the mounting portion is arranged on the base body, the first avoiding notch and the second avoiding notch are both located at one side of the mounting portion, when a part of the operating portion is located in the first avoiding notch, the flat shaft is located at the insertion position, and when a part of the operating portion is located in the second avoiding notch, the flat shaft is located at the move-out position.

In some embodiments, the tensioning rod is arranged in a bent manner so as to form the tensioning pin and the operating portion; and the limiting member includes a limiting piece.

In some embodiments, the connecting member includes a columnar section and a threaded section connected with the columnar section, a diameter of the columnar section is larger than that of the threaded section, the cooperating hole is provided on the columnar section, the columnar section is provided with a rotation stopping face, and a diameter of the flat shaft is smaller than that of the cooperating hole.

Another aspect of the present disclosure provides a LED box assembly, which includes a plurality of boxes and the above-mentioned tensioning mechanism of the box.

In some embodiments, the plurality of boxes cooperate one another in a spliced manner, there are a plurality of tensioning mechanisms for boxes, in the two boxes connected one above the other, one of the boxes is a first box and the other is a second box, and each of the first box and the second box includes a first side, a second side, a third side and a fourth side which are sequentially connected with one another; and the third side of the first box is connected with the first side of the second box by one of the tensioning mechanisms for boxes, the tensioning structure is arranged at the third side of the first box, the connecting member is arranged on the first side of the second box in a penetrating manner, and the third side of the first box is provided with an avoiding hole for avoiding the connecting member on the second box.

According to the technical solution of the present disclosure, the tensioning mechanism of a box includes the tensioning structure and the connecting member. The tensioning structure includes the base and the tensioning rod. The base is provided with the mounting portion, and the tensioning rod includes the tensioning pin and the operating portion connected with the tensioning pin. In this way, the operating portion enables the mounting personnel to conveniently conduct operations on the tensioning rod. The tensioning pin is movably arranged in the mounting portion in a penetrating manner. The connecting member is provided with the cooperating hole. In the disclosure, the tensioning pin includes the flat shaft, and the flat shaft is capable of being inserted into or moved out of the cooperating hole. Under the condition that the flat shaft is inserted into the cooperating hole, the flat shaft has the vertical tensioning position and the transverse unlocking position. Under the condition that the flat shaft is inserted into the cooperating hole, the flat shaft is capable of applying a force to a hole wall of the cooperating hole when being at the vertical tensioning position, and the flat shaft is incapable of applying a force to the hole wall of the cooperating hole when being at the transverse unlocking position. When two adjacent boxes are tensioned close, the connecting member may be connected with one of the boxes, the tensioning structure is connected with the other box, the tensioning rod is moved, then the flat shaft is inserted into the cooperating hole, the flat shaft is switched from the transverse unlocking position to the vertical tensioning position, and in this case, the flat shaft applies a force to the hole wall of the cooperating hole, so as to tension the two adjacent boxes close. Thus, when the two adjacent boxes are tensioned close, the two adjacent boxes may be tensioned close without an external tool (operation rod), thus simplifying a tensioning process and further reducing a gap. Therefore, the technical solution of the disclosure effectively solves the problem that in the related technology, an external tool is required for tensioning two adjacent boxes close, resulting in a complex tensioning process.

BRIEF DESCRIPTION OF THE DRAWINGS

The drawings of the description, which form a part of the disclosure, are used to provide further understanding of the present disclosure, and illustrative embodiments of the present disclosure and the description thereof are used to explain the present disclosure, which are not intended to unduly limit the present disclosure. In the drawings.

Figure 1:
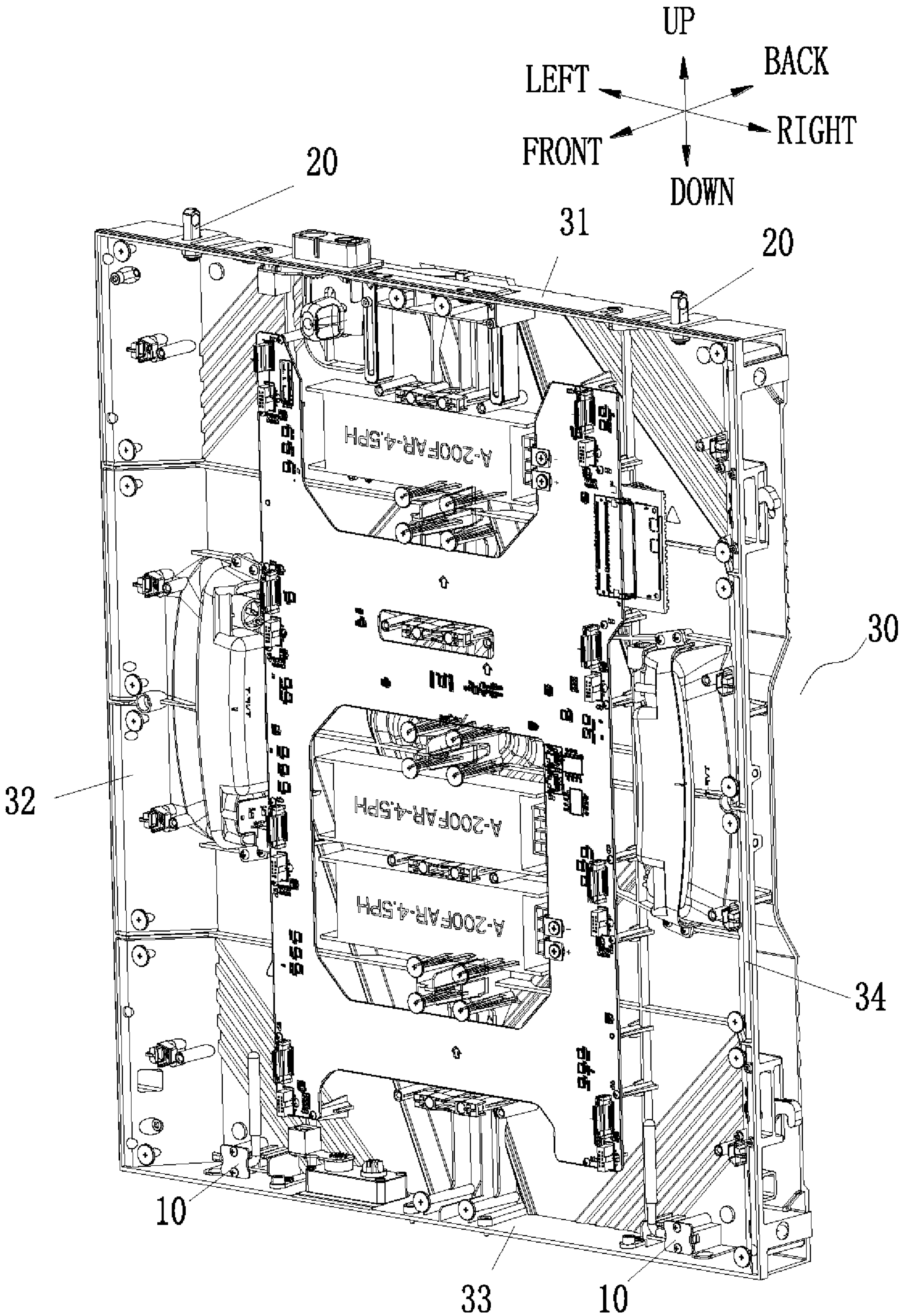
FIG. 1 shows a schematic diagram of a stereostructure of an embodiment of the tensioning mechanism of the box according to the present disclosure, in which a tensioning structure and a connecting member are mounted on a box.
Figure 2:
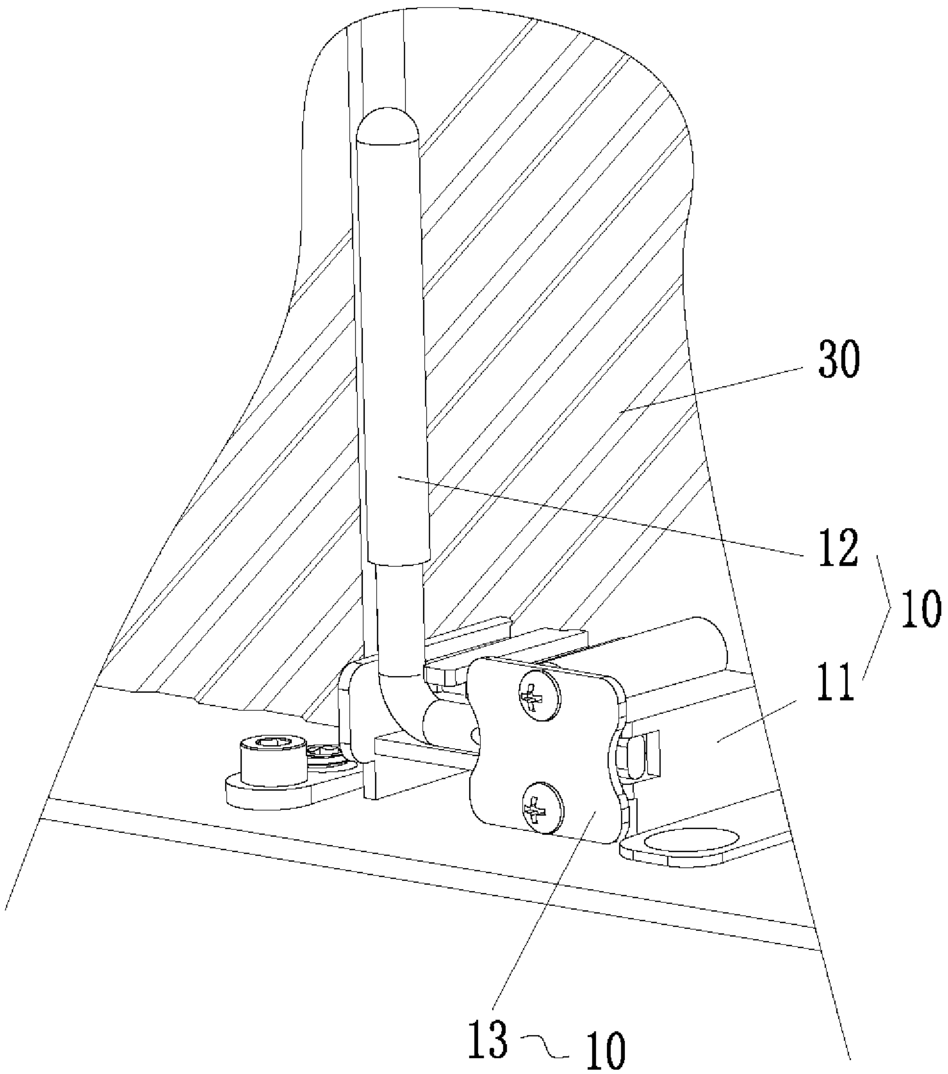
FIG. 2 shows a schematic diagram of a local structure of the tensioning mechanism of the box in FIG. 1.
Figure 3:
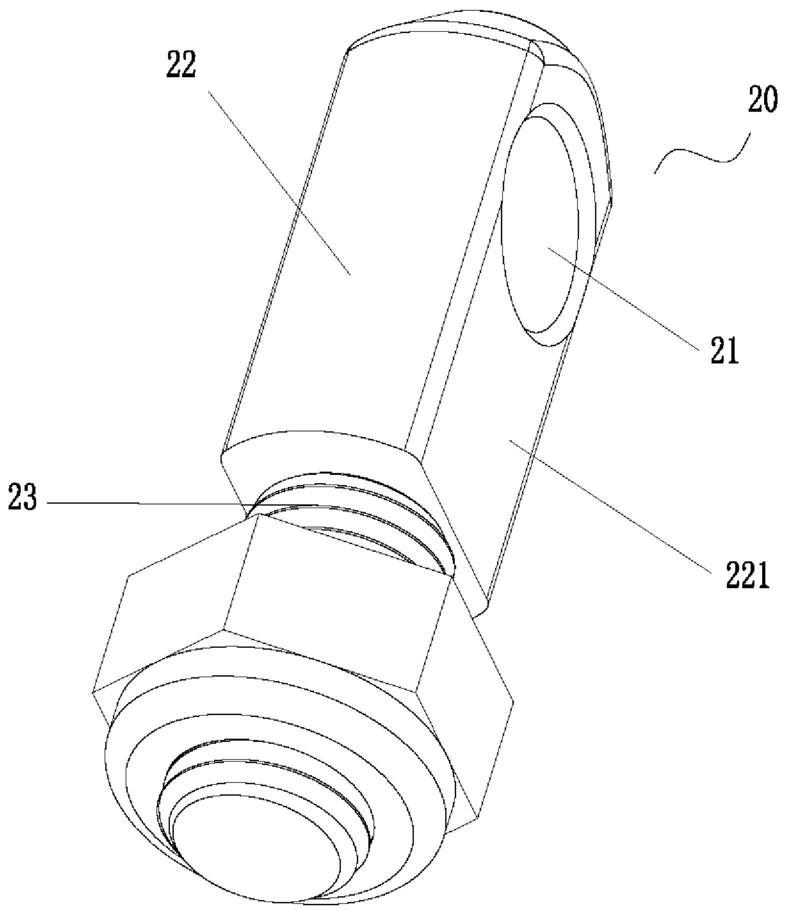
FIG. 3 shows a schematic diagram of a stereostructure of the connecting member of the tensioning mechanism of the box in FIG. 1.
Figure 4:
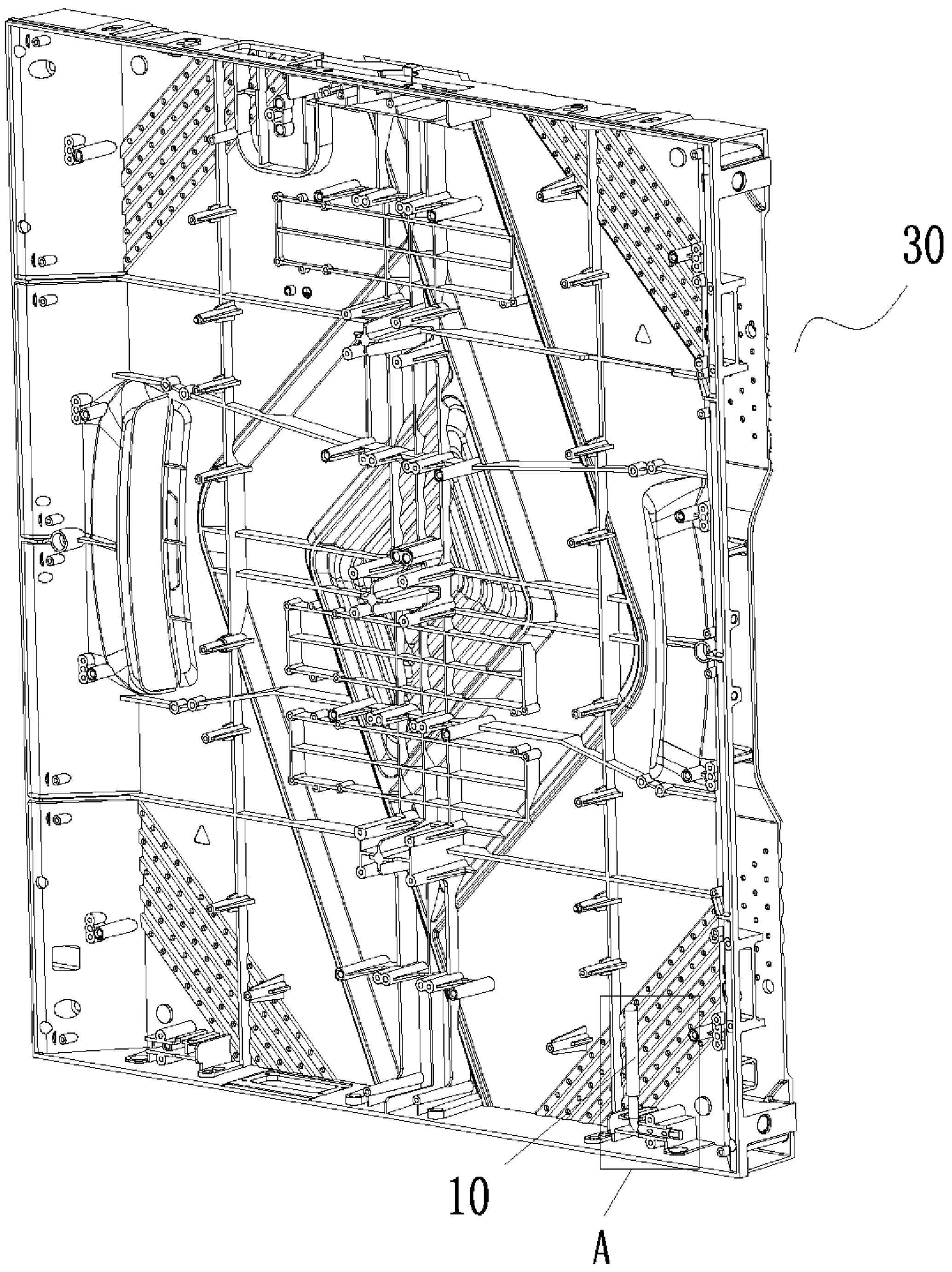
FIG. 4 shows a schematic diagram of a stereostructure of the tensioning mechanism of the box in FIG. 1, in which the tensioning structure is mounted on the box.

The above drawings include the following reference numerals:

10: tensioning structure; 11: base; 111: mounting portion; 112: limiting hole; 113: base body; 1131: first avoiding notch; 1132: second avoiding notch; 12: tensioning rod; 121: tensioning pin; 1211: flat shaft; 1212: cooperating section; 122: operating portion; 13: limiting member; 14: positioning structure; 141: first positioning hole; 142: positioning member; 1421: elastic member; 1422: positioning ball; 143: second positioning hole; 20: connecting member; 21: cooperating hole; 22: columnar section; 221: rotation stopping face; 23: threaded section; 30: box; 31: first side; 331: avoiding hole; 32: second side; 33: third side; and 34: fourth side.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. The following description of at least one exemplary embodiment is merely illustrative in nature and in no way serves as any limitation of the present disclosure and its application or uses. Based on the embodiments of the present disclosure, all the other embodiments obtained by those of ordinary skill in the art without inventive effort are within the scope of the present disclosure.

It should be noted that the terms used herein are merely for describing the detailed description of embodiments and are not intended to limit exemplary embodiments according to the disclosure. As used herein, singular is also intended to include plural unless the context clearly points out singular or plural. In addition, it should be understood that terms "include" and/or "comprise", when used in the description, indicate the presence of features, steps, operations, devices, assemblies, and/or combinations of the foregoing.

It should be noted that the relative arrangement, numerical expressions and numerical values of components and steps described in these embodiments do not limit the scope of the present disclosure unless otherwise specified. More-over, it should be understood that for convenience of description, dimensions of each part shown in the drawings are not drawn according to a real proportional relation. Technologies, methods and devices known to those of ordinary skill in related fields may not be discussed in detail, but in appropriate cases, they should be regarded as part of the description. In all the examples shown and discussed herein, any specific value should be interpreted as exemplary only, not as a limitation. Therefore, other examples of exemplary embodiments may have different values. It should be noted that like numerals and letters denote like items in the following accompanying drawings, and therefore, once an item is defined in one accompanying drawing, it need not be further discussed in the subsequent accompanying drawings.

As shown in FIGS. 1-5 and FIG. 11, a tensioning mechanism of a box of the embodiment includes a tensioning structure 10 and a connecting member 20. The tensioning structure 10 includes a base 11 and a tensioning rod 12. The base 11 is provided with a mounting portion 111, and the tensioning rod 12 includes a tensioning pin 121 and an operating portion 122 connected with the tensioning pin 121. The tensioning pin 121 is movably arranged in the mounting portion 111 in a penetrating manner. The connecting member 20 is provided with a cooperating hole 21. In the embodiment, the tensioning pin 121 includes a flat shaft 1211, and the flat shaft 1211 is capable of being inserted into or moved out of the cooperating hole 21. Under the condition that the flat shaft 1211 is inserted into the cooperating hole 21, the flat shaft 1211 has a vertical tensioning position and a transverse unlocking position.

According to the technical solution of the embodiment, the tensioning rod 12 includes the tensioning pin 121 and the operating portion 122 connected with the tensioning pin 121. In this way, the operating portion 122 enables the mounting personnel to conveniently conduct operations on the tensioning rod 12. In the embodiment, the tensioning pin 121 includes the flat shaft 1211, and the flat shaft 1211 is capable of being inserted into or moved out of the cooperating hole 21. Under the condition that the flat shaft 1211 is inserted into the cooperating hole 21, the flat shaft 1211 has the vertical tensioning position and the transverse unlocking position. Under the condition that the flat shaft 1211 is inserted into the cooperating hole 21, the flat shaft 1211 is capable of applying a force upwardly to a hole wall of the cooperating hole 21 when the flat shaft 1211 is at the vertical tensioning position, and the flat shaft 1211 is incapable of applying a force to the hole wall of the cooperating hole 21 when the flat shaft 1211 is at the transverse unlocking position. When two adjacent boxes are tensioned close, the connecting member 20 may be connected with one of the boxes, the tensioning structure 10 is connected with the other box, the tensioning rod 12 is moved, then the flat shaft 1211 is inserted into the cooperating hole 21, at this time, the flat shaft 1211 is at the transverse unlocking position, then the flat shaft 1211 is switched from the transverse unlocking position to the vertical tensioning position, and in this case, the flat shaft 1211 applies a force upwardly to the hole wall of the cooperating hole 21, so as to tension the two adjacent boxes close. Thus, when the two adjacent boxes are tensioned close, the two adjacent boxes may be tensioned close without an external tool (operation rod), thus simplifying a tensioning process and then reducing a gap. Therefore, the technical solution of the embodiment effectively solves the problem that in the related technology, an external tool is required for tensioning two adjacent boxes close, resulting in a complex tensioning process.

It should be noted that the flat shaft 1211 of the embodiment has a long axis A1 and a short axis A2, the vertical tensioning position means that the long axis A1 of the flat shaft 1211 is vertical, and the transverse unlocking position means that the short axis A2 of the flat shaft 1211 is vertical. The flat shaft 1211 switches between the transverse unlocking position and the vertical tensioning position by rotation.

As shown in FIGS. 2-7, to facilitate machining and shaping, the mounting portion 111 is a mounting groove. The tensioning structure 10 further includes a limiting member 13, and the limiting member 13 is connected with the base 11 and located at an opening of the mounting groove. The limiting member 13 is capable of limiting the tensioning rod 12 on the mounting groove, so as to prevent the tensioning pin 121 from being separated from the mounting groove during movement in the mounting groove.

As shown in FIGS. 4-7, the tensioning pin 121 further includes a cooperating section 1212 arranged between the flat shaft 1211 and the operating portion 122. The flat shaft 1211 and the operating portion 122 are connected with two ends of the cooperating section 1212 respectively. To enable the flat shaft 1211 to be stably kept to be inserted into the cooperating hole 21 or moved out of the cooperating hole 21, the tensioning structure 10 further includes a positioning structure 14 arranged between the cooperating section 1212 and the base 11. The positioning structure 14 enables the flat shaft 1211 to be kept at an insertion position for insertion into the cooperating hole 21 or a move-out position for movement out of the cooperating hole 21.

As shown in FIGS. 4-8, the positioning structure 14 includes a positioning member 142, a first positioning hole 141 and a second positioning hole 143. The first positioning hole 141 is located between the second positioning hole 143 and the flat shaft 1211, and the cooperating section 1212 is provided with the first positioning hole 141 and the second positioning hole 143. The base 11 is provided with the positioning member 142. When the positioning member 142 matches the first positioning hole 141, the flat shaft 1211 is kept at the insertion position, and when the positioning member 142 matches the second positioning hole 143, the flat shaft 1211 is kept at the move-out position. In this way, when the positioning member 142 matches the first positioning hole 141, the flat shaft 1211 is capable of being stably kept at the insertion position, and when the positioning member 142 matches the second positioning hole 143, the flat shaft 1211 is capable of being stably kept at the move-out position. The positioning member 142 matches the first positioning hole 141 and the second positioning hole 143, so that the positioning structure 14 has a simple structure and is economical.

As shown in FIGS. 4-8, the positioning structure 14 further includes a limiting hole 112 provided on the base 11. The positioning member 142 includes an elastic member 1421 and a positioning ball 1422 which are mounted in the limiting hole 112. The elastic member 1421 applies an elastic force to the positioning ball 1422. In this way, the limiting hole 112 prevents the elastic member 1421 and the positioning ball 1422 from being separated from the limiting hole 112, specifically, an opening of the limiting hole 112 is provided with an arc-shaped concave cavity, the arc-shaped concave cavity is stuck at a position over a radius of the positioning ball 1422, thus effectively preventing the positioning ball 1422 from being separated from the limiting hole 112 under the action of the elastic force, and the positioning ball 1422 and a hole wall of the limiting hole 112 are capable of limiting two ends of the elastic member 1421, so as to make the elastic member 1421 stressed all the time.

A diameter of the first positioning hole 141 and a diameter of the second positioning hole 143 are both smaller than that of the positioning ball 1422. When the tensioning pin 121 moves, a part of the positioning ball 1422 has a positioning position located in the first positioning hole 141 or the second positioning hole 143 and an avoiding position for avoiding the flat shaft 1211. Specifically, when the positioning member 142 matches the first positioning hole 141, a part of the positioning ball 1422 is located in the first positioning hole 141, thus limiting the cooperating section 1212 vertically and horizontally. The limiting member 13 and a part of the positioning ball 1422 work together to limit the cooperating section 1212 between the positioning ball 1422 and the limiting member 13, thus preventing the cooperating section 1212 from moving in the mounting groove. When the positioning member 142 matches the second positioning hole 143, a part of the positioning ball 1422 is located in the second positioning hole 143, thus limiting the cooperating section 1212 vertically and horizontally. The limiting member 13 and part of the positioning ball 1422 may work together to limit the cooperating section 1212 between the positioning ball 1422 and the limiting member 13, thus preventing the cooperating section 1212 from moving in the mounting groove.

Figure 5:
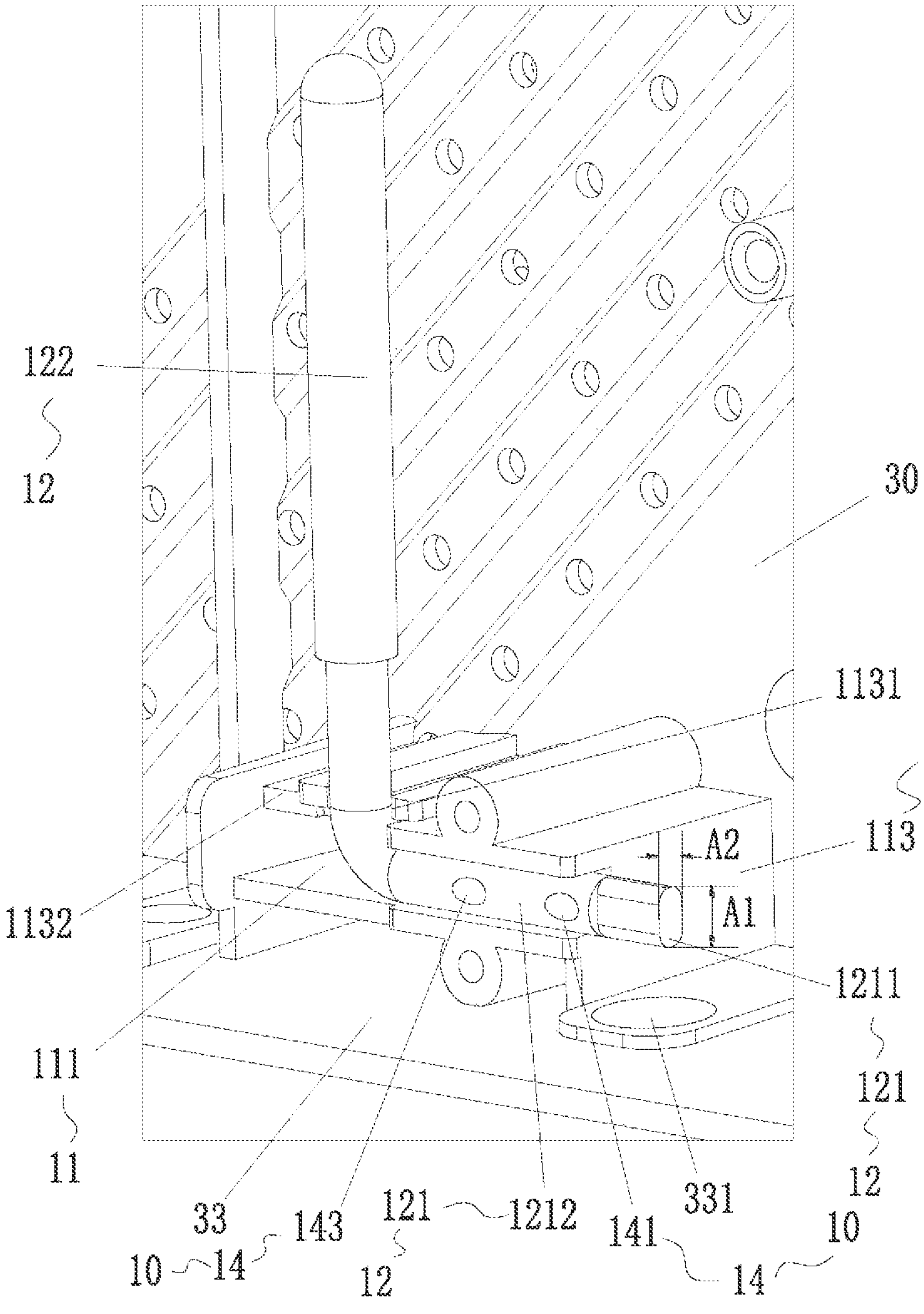
FIG. 5 shows an enlarged schematic diagram of portion A of the tensioning mechanism of the box in FIG. 4.
Figure 6:
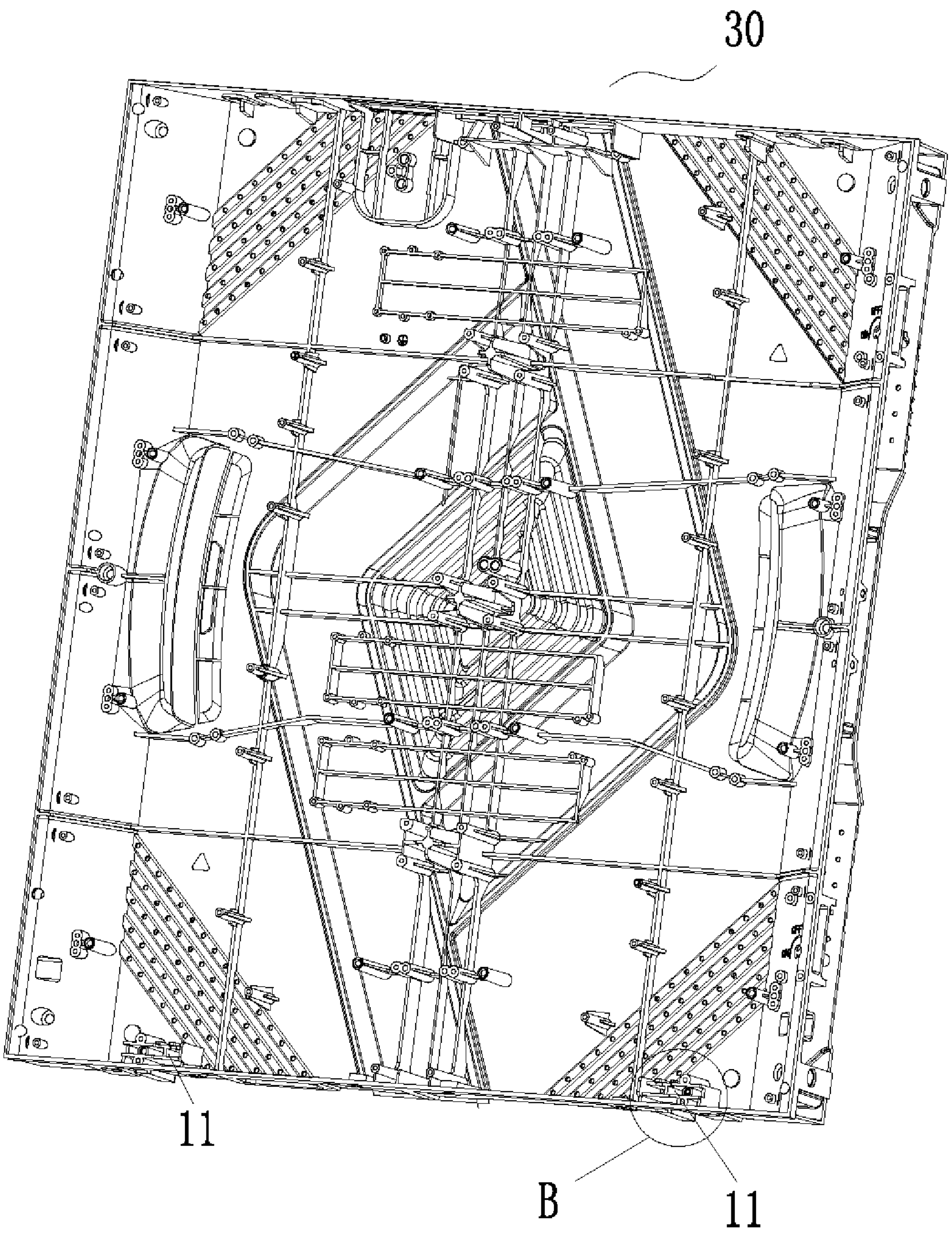
FIG. 6 shows a schematic diagram of a stereostructure of the tensioning mechanism of a box in FIG. 1, in which the tensioning rod removed from the box.
Figure 7:
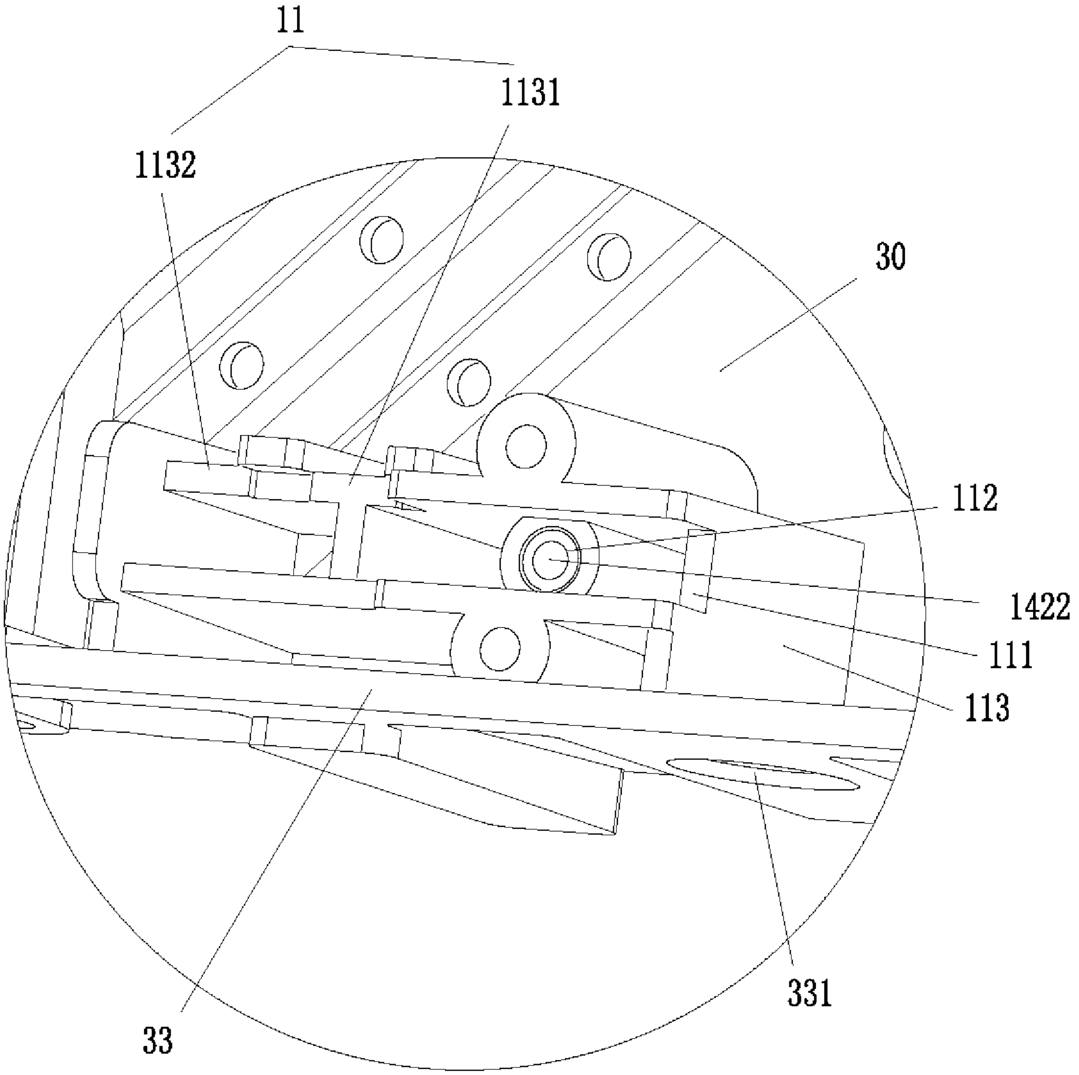
FIG. 7 shows an enlarged schematic diagram of portion B of the tensioning mechanism of the box in FIG. 6.
Figure 8:
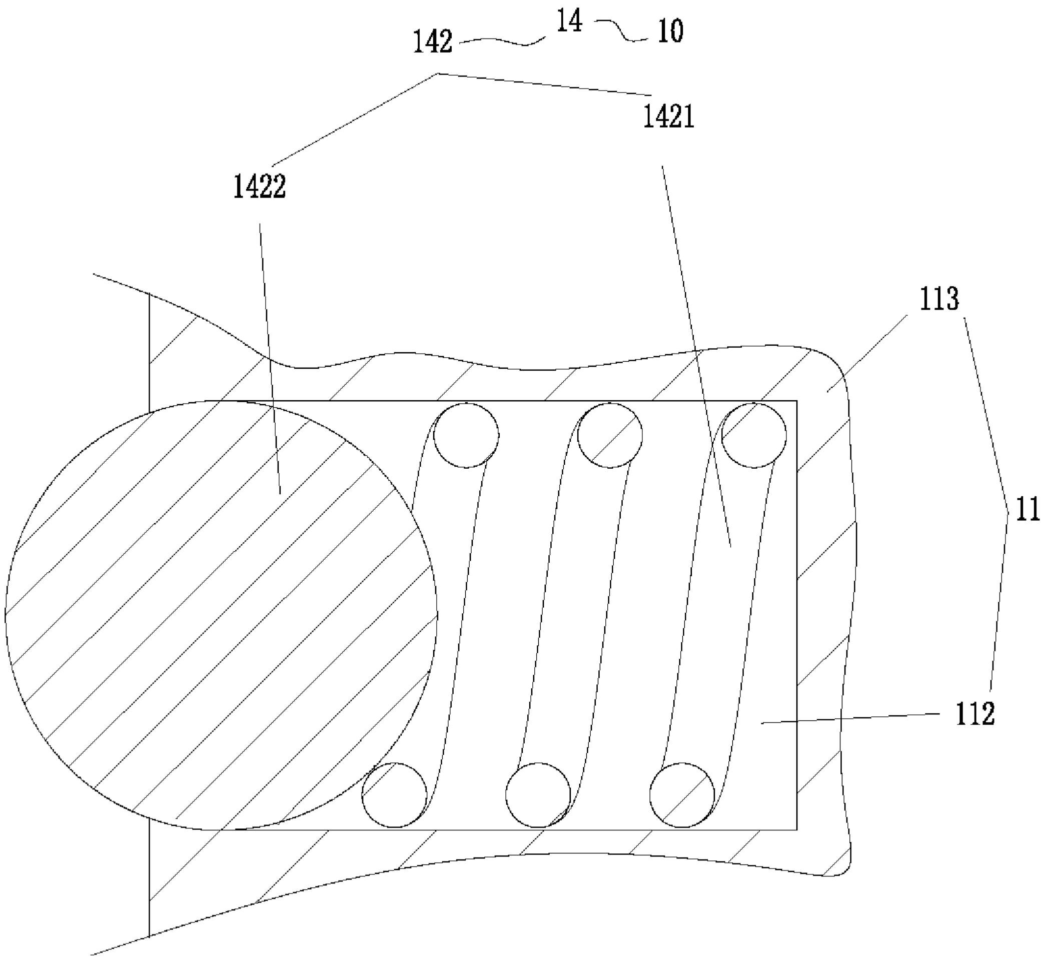
FIG. 8 shows a schematic diagram of a local section view of the tensioning mechanism of the box in FIG. 7.
Figure 9:
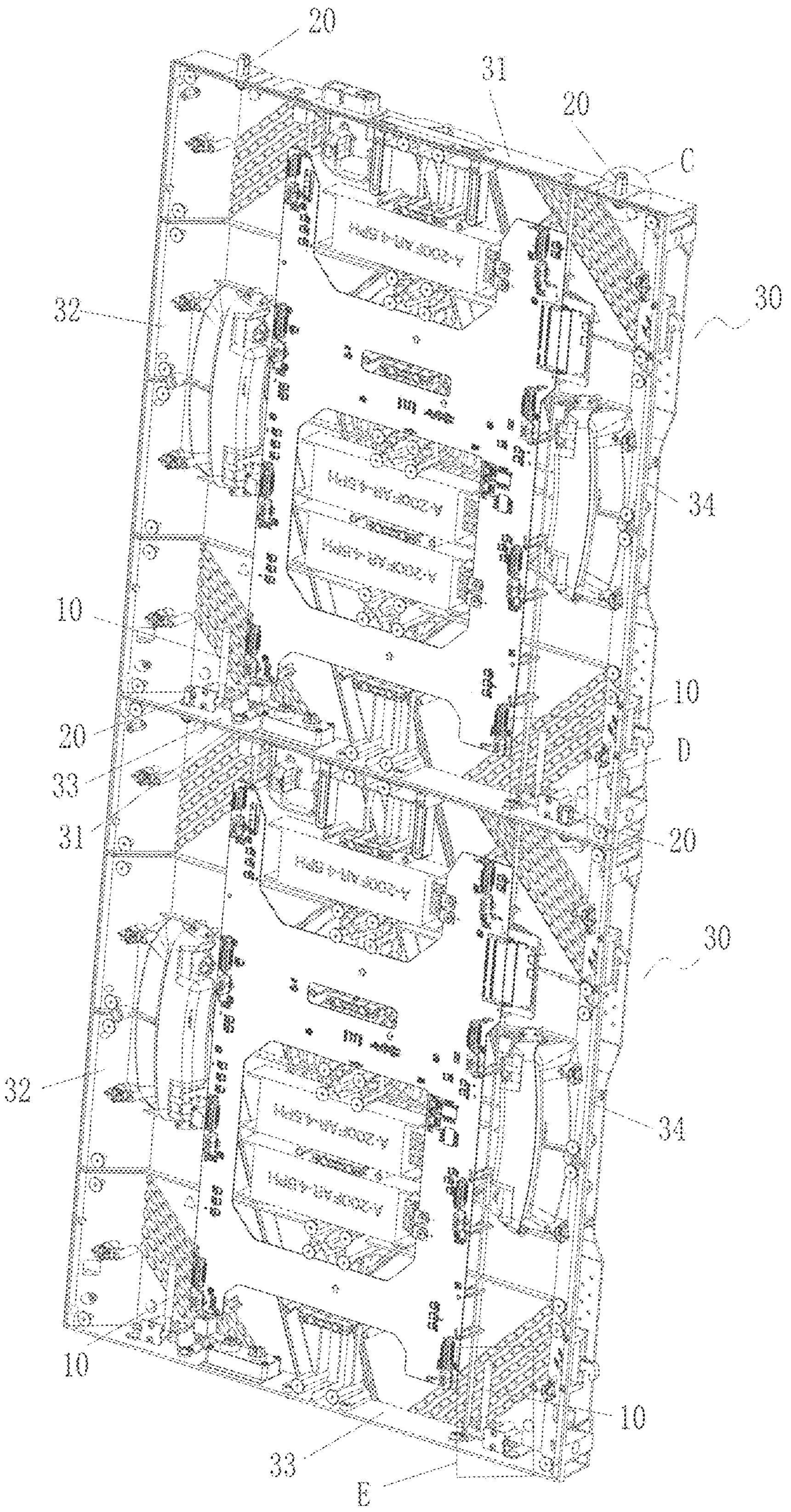
FIG. 9 shows a schematic diagram of a stereostructure of an embodiment of a light emitting diode (LED) box assembly according to the present disclosure.
Figure 10:
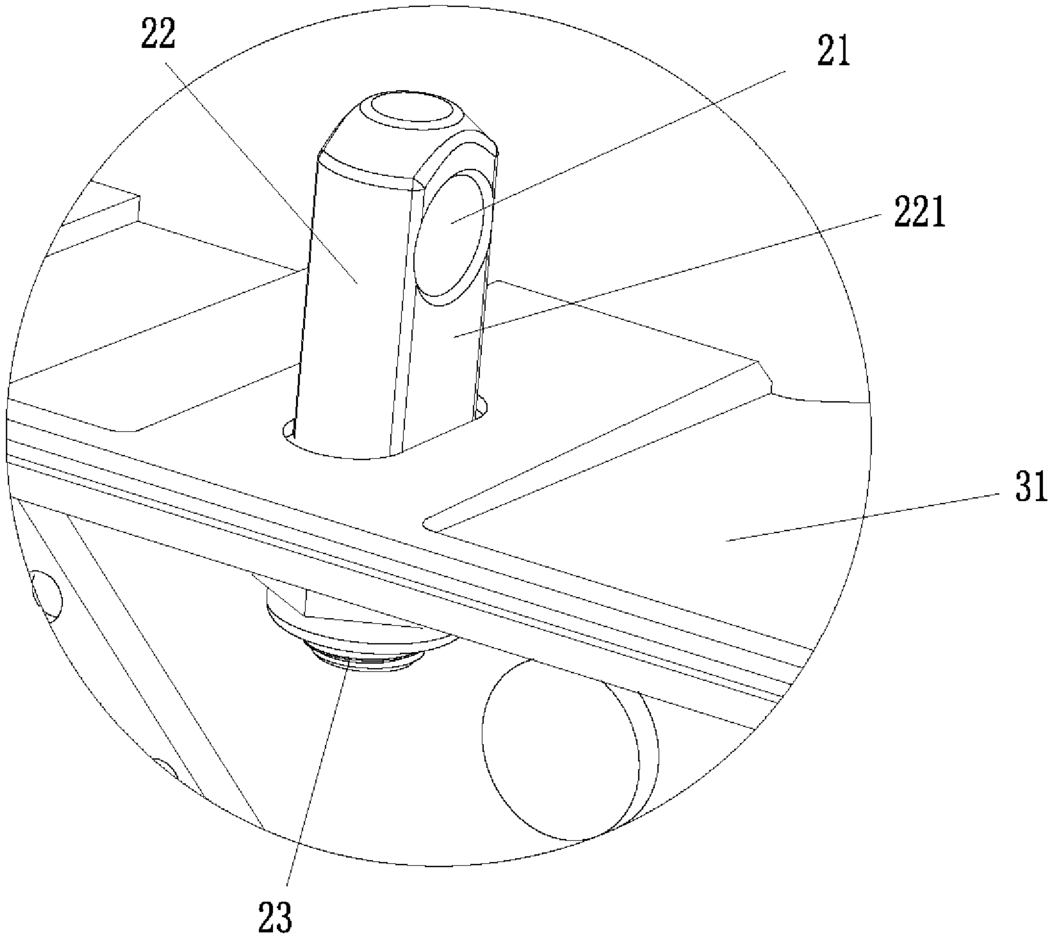
FIG. 10 shows an enlarged schematic diagram of portion C of the LED box assembly in FIG. 9.
Figure 11:
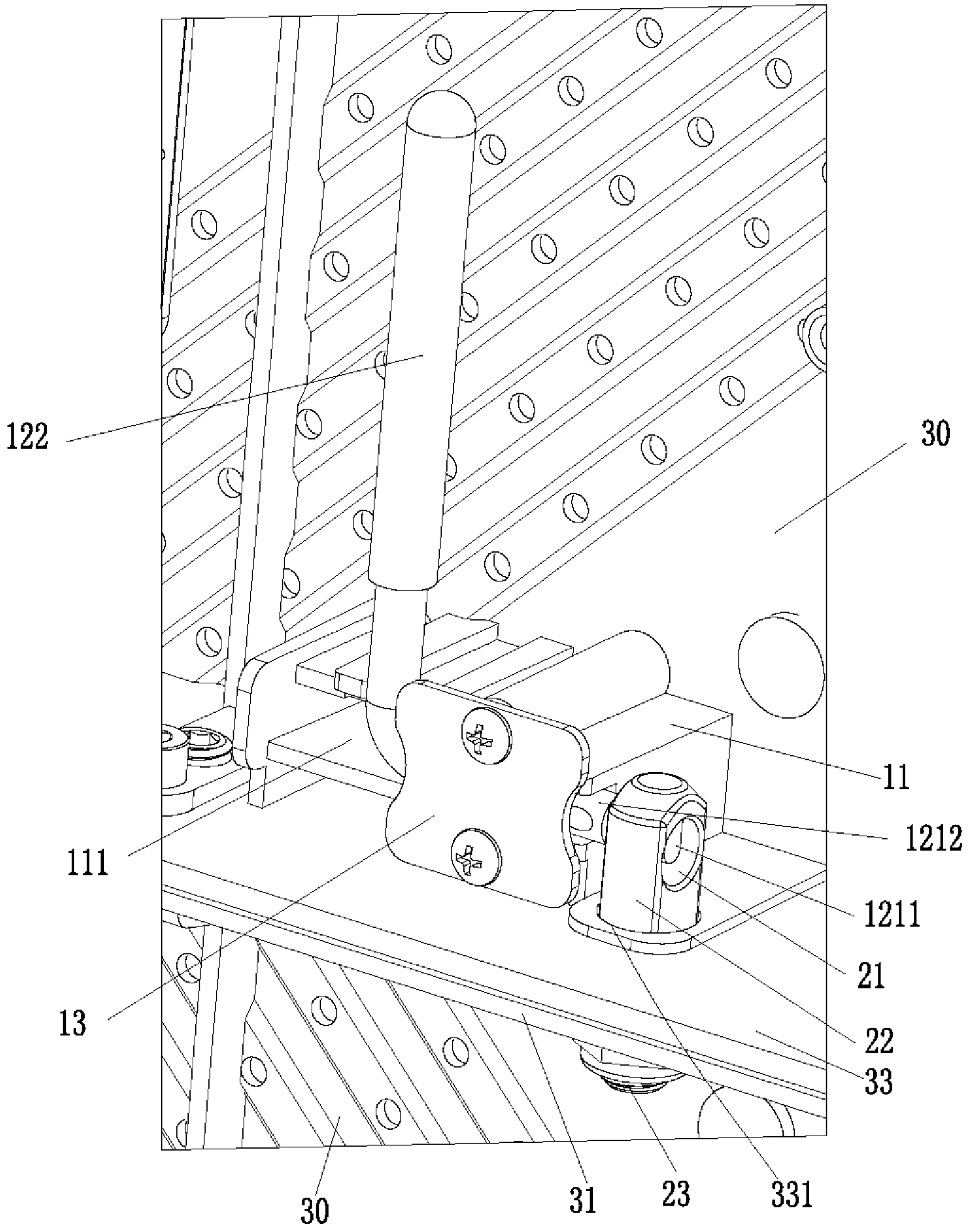
FIG. 11 shows an enlarged schematic diagram of portion D of the LED box assembly in FIG. 9.
Figure 12:
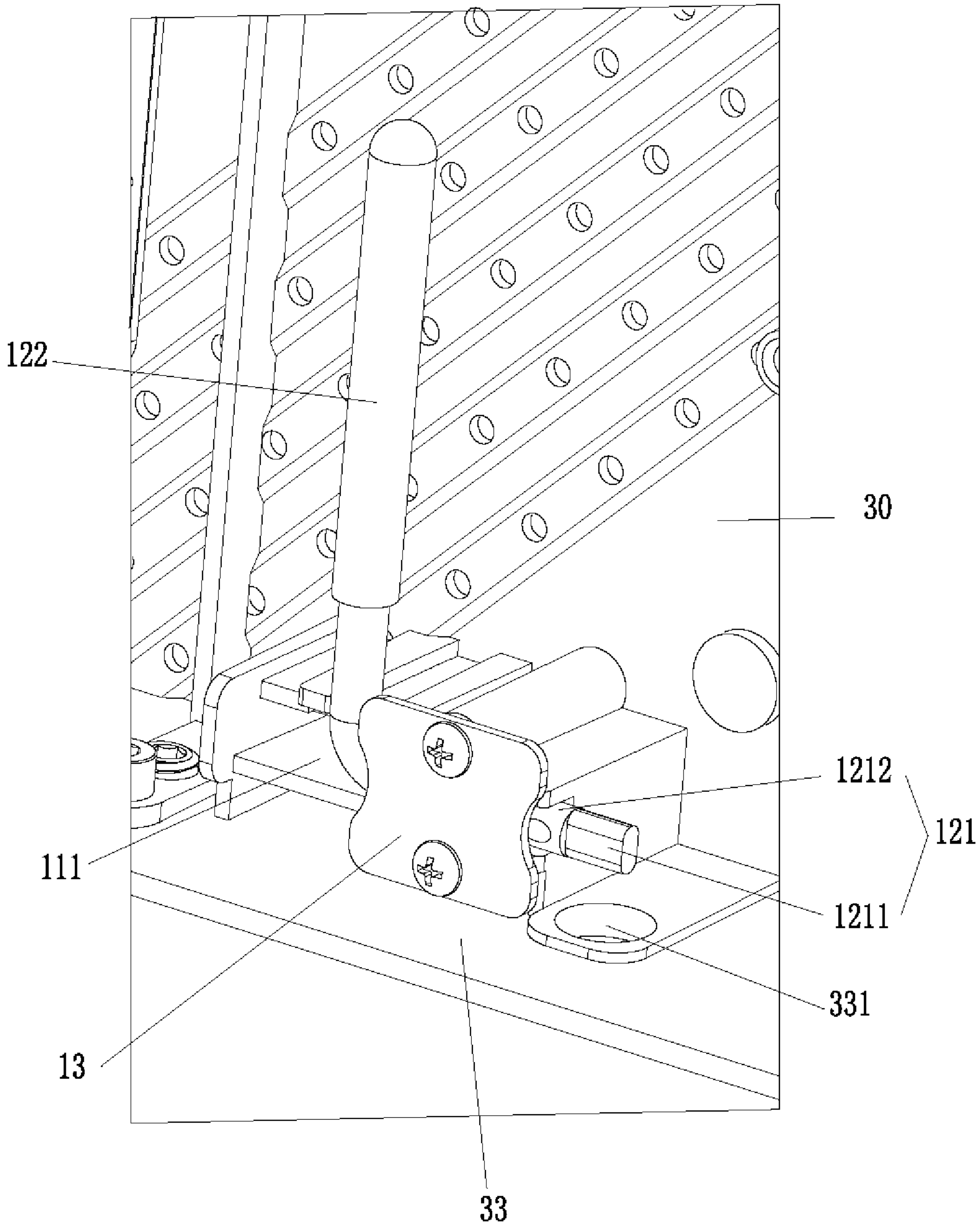
FIG. 12 shows an enlarged schematic diagram of portion E of the LED box assembly in FIG. 9.

As shown in FIGS. 5-7, the base 11 includes a base body 113 as well as a first avoiding notch 1131 and a second avoiding notch 1132 which are arranged on the base body 113 in a spaced manner. The first avoiding notch 1131 is located between the second avoiding notch 1132 and the flat shaft 1211, and the mounting portion 111 is arranged on the base body 113. The first avoiding notch 1131 and the second avoiding notch 1132 are both located at one side of the mounting portion 111. When a part of the operating portion 122 is located in the first avoiding notch 1131, the flat shaft 1211 is located at the insertion position, and when a part of the operating portion 122 is located in the second avoiding notch 1132, the flat shaft 1211 is located at the move-out position. In this way, both the first avoiding notch 1131 and the second avoiding notch 1132 are capable of avoiding the operating portion 122, so as to prevent the operating portion 122 from interfering with one side of the mounting portion 111, so that the operating portion 122 is capable of standing on the base body 113, an internal space of a box may be saved, and a structure in the box (such as a signal line or power line or control board) is more compact. The flat shaft 1211 switches between the insertion position and the move-out position by movement.

As shown in FIGS. 5-7, to optimize a structural layout and facilitate production, manufacturing and mounting, the tensioning rod 12 is arranged in a bent manner so as to form the tensioning pin 121 and the operating portion 122. In this way, the tensioning pin 121 is rotated by the operating portion 122 in a time-saving and labor-saving manner.

As shown in FIGS. 2-5, the limiting member 13 includes a limiting piece. The limiting piece has a simple structure and facilitates machining and shaping. Specifically, a side, facing the cooperating section 1212, of the limiting piece is provided with an arc-shaped groove, the arc-shaped groove matches the cooperating section 1212 in shape, under the condition that the limiting member 13 and a part of the positioning ball 1422 work together, the limiting member 13 is capable of being fitted to an outer side of the cooperating section 1212, resulting in a large contact area between the limiting member and the cooperating section and a better limiting effect.

As shown in FIGS. 1, 3, 10 and 11, the connecting member 20 includes a columnar section 22 and a threaded section 23 connected with the columnar section 22. A diameter of the columnar section 22 is larger than that of the threaded section 23, so that a stepped face is formed between the columnar section 22 and the threaded section 23, the stepped face is capable of being locked on a side face of a box, and the threaded section 23 is conveniently connected with a box. To connect the threaded section 23 to a box more reliably, the connecting member 20 further includes a nut matching the threaded section 23, so that the nut and the columnar section 22 are arranged on a partial structure of a box in a clamped manner. The cooperating hole 21 is provided on the columnar section 22. In the process of screwing the nut on the threaded section 23, to prevent the columnar section 22 from rotating relative to a box, the columnar section 22 is provided with a rotation stopping face 221. A torque may be further shortened when the tensioning rod is rotated, thus saving more labor during tensioning. The flat shaft 1211 is inserted into or moved out of the cooperating hole 21 smoothly, and a maximum diameter of the flat shaft 1211 is smaller than that of the cooperating hole 21. When the flat shaft 1211 is inserted into the cooperating hole 21 and the flat shaft 1211 is at the transverse unlocking position, the short axis A2 of the flat shaft 1211 is close to the top wall of the hole wall of the cooperating hole 21. The distance between the short axis A2 and the top wall of the hole wall of the cooperating hole 21 is smaller than a half of the difference between a length of the long axis A1 and a length of the short axis A2. When the flat shaft 1211 is switched from the transverse unlocking position to the vertical tensioning position, the long axis A1 of the flat shaft 1211 applies a force upwardly to the top wall of the hole wall of the cooperating hole 21.

The disclosure further provides a light emitting diode (LED) box assembly. As shown in FIGS. 9-12, the LED box assembly includes a plurality of boxes 30 and the above-mentioned tensioning mechanism of the box. The above-mentioned tensioning mechanism of the box may solve the problem that in the related technology, an external tool is required for tensioning two adjacent boxes close, resulting in a complex tensioning process, so the LED box assembly with the tensioning mechanism of the box may solve the same technical problem.

As shown in FIGS. 9-12, two boxes 30 match each other in a spliced manner, and there are four tensioning mechanisms for boxes. Each of a first box and a second box is provided with two tensioning mechanisms of boxes. In the two boxes 30 connected one above the other, one of the boxes 30 is the first box and the other is the second box, and each of the first box and the second box includes a first side 31, a second side 32, a third side 33 and a fourth side 34 which are sequentially connected with one another. The third side 33 of the first box is connected with the first side 31 of the second box by a tensioning mechanism of a box, the tensioning structure 10 is arranged at the third side 33 of the first box, the connecting member 20 is arranged on the first side 31 of the second box in a penetrating manner, and the third side 33 of the first box is provided with an avoiding hole 331 for avoiding the connecting member 20 on the second box. The avoiding hole 331 enables the third side 33 of the first box to avoid the connecting member 20 conveniently, so that the connecting member 20 is capable of penetrating the third side 33 of the first box. Specifically, after the first box and the second box are connected one above the other, the mounting personnel pulls the operating portion 122 outward and then pushes the operating portion rightward to enable the flat shaft 1211 of the tensioning pin 121 to be completely inserted into the cooperating hole 21 of the columnar section 22, and then the mounting personnel pulls the operating portion 122 upward into the first avoiding notch 1131. In this case, the flat shaft 1211 rotates from the transverse unlocking position to the vertical tensioning position, and the tensioning mechanism of the box may draw the first box at an upper position and the second box at a lower position close. The number of boxes 30 matching one another in a spliced manner may be not limited to two, but also four, six or more. The number of tensioning mechanisms of boxes may not be limited to four, but can also be increased or decreased according to the number of boxes 30 matching one another in a spliced manner.

In the description of the present disclosure, it should be understood that orientations or positional relationships indicated by the terms “front, rear, upper, lower, left and right”, “transverse, vertical, perpendicular, and horizontal”, “top and bottom”, etc. are based on the orientations or positional relationships shown in the accompanying drawings and are only for facilitating the description of the present disclosure and simplifying the description, and in the absence of a statement to the contrary, the orientations do not indicate or implies that a device or element referred to must have a particular orientation or be constructed and operated in a particular orientation, and therefore will not be interpreted as limiting the scope of protection of the present disclosure; and the words “inside and outside” refer to inside and outside relative to an outline of each component itself.

For ease of description, spatial relative terms such as “over”, “above”, “on an upper surface” and “on” may be used herein to describe spatial positional relations of one device or feature with other devices or features as shown in the drawings. It should be understood that the spatial relative terms are intended to include different orientations in use or operation in addition to the orientation of the device described in the drawings. For example, if the device in the drawings is inverted, the device described as “above” or “over” other devices or structures would then be positioned “below” or “under” the other devices or structures. Thus the exemplary term “above” may include two orientations of “above” and “below.” The device may also be positioned (rotated 90 degrees or at other orientations) in other different ways and the spatial relative description used herein is interpreted accordingly.

In addition, it should be noted that words “first” and “second” are used to define parts only for convenience of distinguishing corresponding parts. Unless otherwise stated, the above words have no special meaning, so they cannot be understood as limiting the scope of protection of the present disclosure.

The above has been described only as preferred embodiments of the present disclosure and is not intended to limit the present disclosure, which can be modified and changed, for those skilled in the art. Any modifications, equivalent substitutions, improvements, etc. within the spirit and principles of the present disclosure are intended to fall within the scope of protection of the present disclosure.

What is claimed is:

1. A tensioning mechanism of a box, comprising:

a tensioning structure comprising a base and a tensioning rod, wherein the base is provided with a mounting portion, the tensioning rod comprises a tensioning pin and an operating portion connected with the tensioning pin, and the tensioning pin is movably arranged in the mounting portion in a penetrating manner; and a connecting member, wherein the connecting member is provided with a cooperating hole, wherein the tensioning pin comprises a flat shaft, the flat shaft is able to being inserted into or moved out of the cooperating hole, and under the condition that the flat shaft is inserted into the cooperating hole, the flat shaft has a vertical tensioning position and a transverse unlocking position;

wherein the tensioning pin further comprises a cooperating section arranged between the flat shaft and the operating portion, the tensioning structure further comprises a positioning structure arranged between the cooperating section and the base, and the positioning structure enables the flat shaft to be kept at an insertion position for inserting into the cooperating hole or a move-out position for moving out of the cooperating hole; and wherein the positioning structure comprises a positioning member, a first positioning hole and a second positioning hole, the first positioning hole is located between the second positioning hole and the flat shaft, the cooperating section is provided with the first positioning hole and the second positioning hole, the base is provided with the positioning member, when the positioning member cooperates the first positioning hole, the flat shaft is kept at the insertion position, and when the positioning member cooperates the second positioning hole, the flat shaft is kept at the move-out position.

2. The tensioning mechanism of the box as claimed as claim 1, wherein the mounting portion is a mounting groove, the tensioning structure further comprises a limiting member, and the limiting member is connected with the base and located at an opening of the mounting groove.

3. The tensioning mechanism of a box as claimed as claim 1, wherein the positioning structure further comprises a limiting hole provided on the base, the positioning member comprises an elastic member and a positioning ball which are mounted in the limiting hole, the elastic member applies an elastic force to the positioning ball, a diameter of the first positioning hole and a diameter of the second positioning hole are both smaller than a diameter of the positioning ball, and when the tensioning pin moves, a part of the positioning ball has a positioning position located in the first positioning hole or the second positioning hole and an avoiding position for avoiding the flat shaft.

4. The tensioning mechanism of a box as claimed as claim 1, wherein the base comprises a base body as well as a first avoiding notch and a second avoiding notch which are arranged on the base body in a spaced manner, the first avoiding notch is located between the second avoiding notch and the flat shaft, the mounting portion is arranged on the base body, the first avoiding notch and the second avoiding notch are both located at one side of the mounting portion, when a part of the operating portion is located in the first avoiding notch, the flat shaft is located at the insertion position, and when a part of the operating portion is located in the second avoiding notch, the flat shaft is located at the move-out position.

5. The tensioning mechanism of a box as claimed as claim 2, wherein the tensioning rod is arranged in a bent manner so as to form the tensioning pin and the operating portion; and the limiting member comprises a limiting piece.

6. The tensioning mechanism of a box as claimed as claim 1, wherein the connecting member comprises a columnar section and a threaded section connected with the columnar section, a diameter of the columnar section is larger than a diameter of the threaded section, the cooperating hole is provided on the columnar section, the columnar section is provided with a rotation stopping face, and a diameter of the flat shaft is smaller than a diameter of the cooperating hole.

7. A light emitting diode box assembly, comprising a plurality of boxes and the tensioning mechanism of the box as claimed as claim 1.

8. The LED box assembly as claimed as claim 7, wherein the plurality of boxes cooperate one another in a spliced manner, there are a plurality of tensioning mechanisms for boxes, in the two boxes connected one above the other, one of the boxes is a first box and the other is a second box, and each of the first box and the second box comprises a first side, a second side, a third side and a fourth side which are sequentially connected with one another; and the third side of the first box is connected with the first side of the second box by one of the tensioning mechanisms for boxes, the tensioning structure is arranged at the third side of the first box, the connecting member is arranged on the first side of the second box in a penetrating manner, and the third side of the first box is provided with an avoiding hole for avoiding the connecting member on the second box.

9. The LED box assembly as claimed as claim 7, wherein the mounting portion is a mounting groove, the tensioning structure further comprises a limiting member, and the limiting member is connected with the base and located at an opening of the mounting groove.

10. The LED box assembly as claimed as claim 7, wherein the positioning structure further comprises a limiting hole provided on the base, the positioning member comprises an elastic member and a positioning ball which are mounted in the limiting hole, the elastic member applies an elastic force to the positioning ball, a diameter of the first positioning hole and a diameter of the second positioning hole are both smaller than a diameter of the positioning ball, and when the tensioning pin moves, a part of the positioning ball has a positioning position located in the first positioning hole or the second positioning hole and an avoiding position for avoiding the flat shaft.

11. The LED box assembly as claimed as claim 7, wherein the base comprises a base body as well as a first avoiding notch and a second avoiding notch which are arranged on the base body in a spaced manner, the first avoiding notch is located between the second avoiding notch and the flat shaft, the mounting portion is arranged on the base body, the first avoiding notch and the second avoiding notch are both located at one side of the mounting portion, when a part of the operating portion is located in the first avoiding notch, the flat shaft is located at the insertion position, and when a part of the operating portion is located in the second avoiding notch, the flat shaft is located at the move-out position.

12. The LED box assembly as claimed as claim 9, wherein the tensioning rod is arranged in a bent manner so as to form the tensioning pin and the operating portion; and the limiting member comprises a limiting piece.

13. The LED box assembly as claimed as claim 7, wherein the connecting member comprises a columnar section and a threaded section connected with the columnar section, a diameter of the columnar section is larger than a diameter of the threaded section, the cooperating hole is provided on the columnar section, the columnar section is provided with a rotation stopping face, and a diameter of the flat shaft is smaller than a diameter of the cooperating hole.

* * * * *